United States Patent Office 3,579,638
Patented May 25, 1971

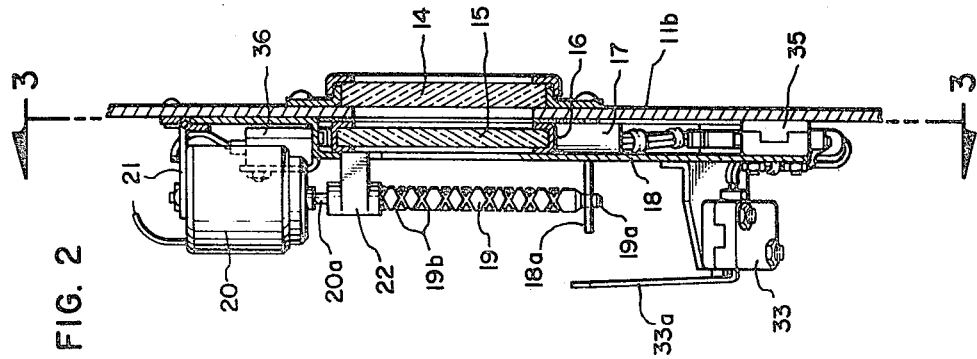
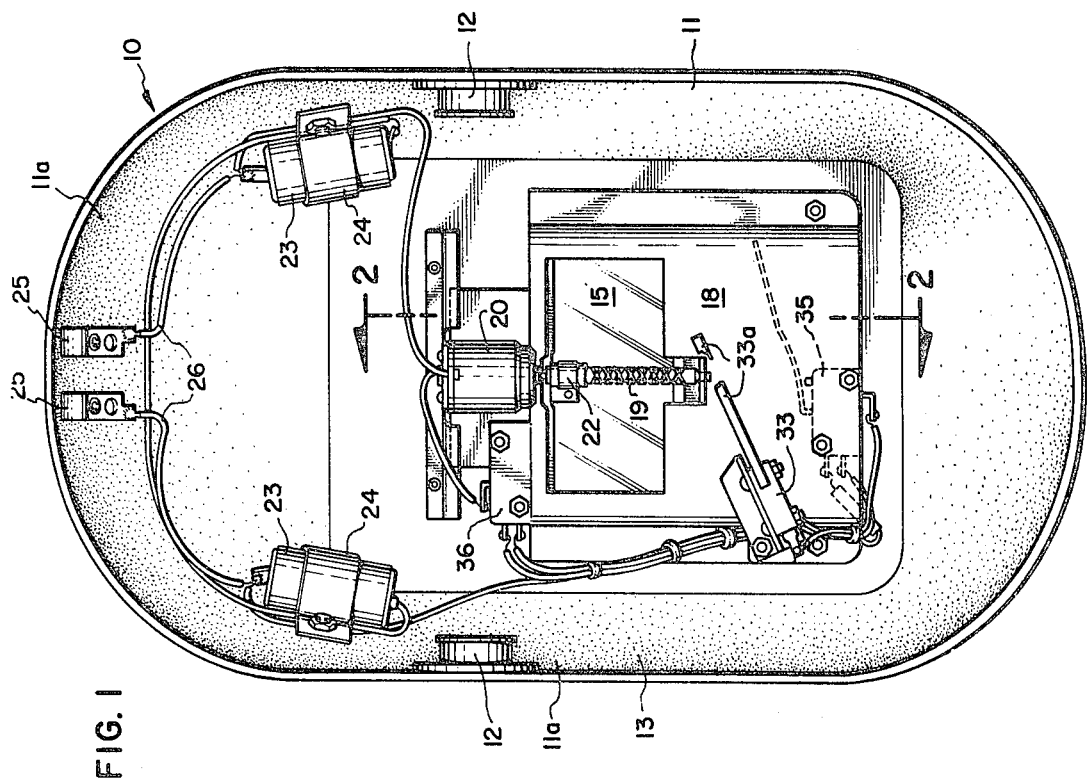

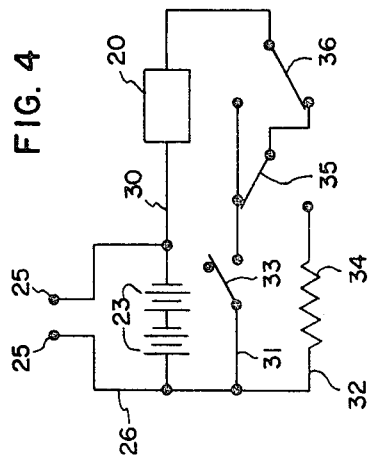
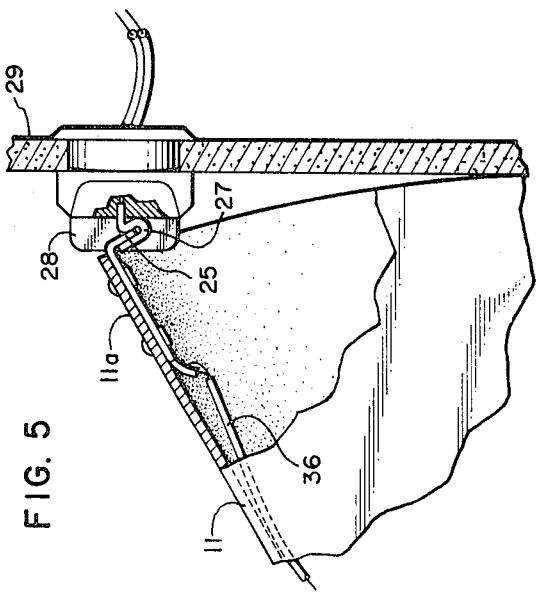
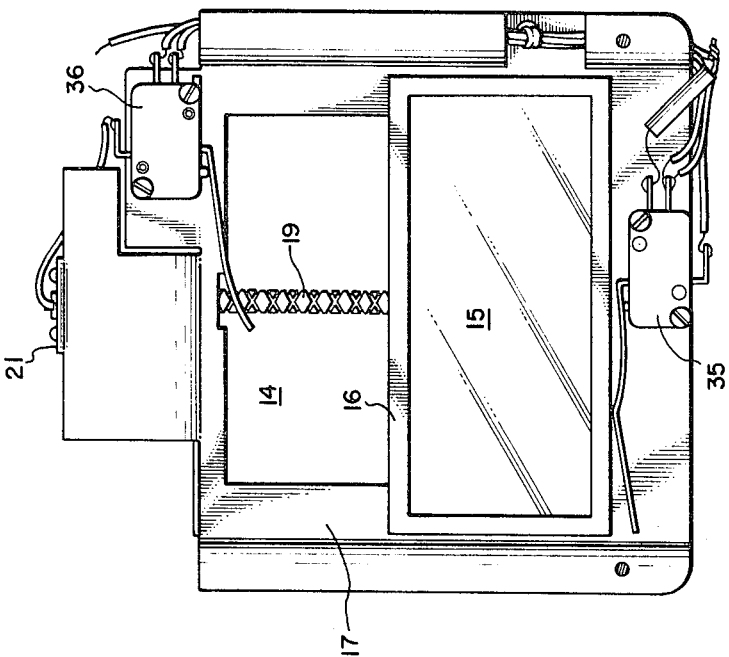

3,579,638
EYE-SHIELD OPERATING SYSTEM FOR
WELDING HELMETS
Frank J. Davis and George Zahnor Edwards, Salt Lake
City, Utah, assignors to Kedman Company, Salt Lake
City, Utah
Filed Sept. 23, 1969, Ser. No. 860,210
Int. Cl. A61f 9/06
U.S. Cl. 2—8                                        9 Claims

ABSTRACT OF THE DISCLOSURE

The eye-shield lens of a welding helmet is extended and retracted into and out of working position, respectively, by unidirectional rotation of a self-reversing worm working in a pawl attached to the lens frame. The worm is an extension of the drive shaft of a miniature electric motor powered by rechargeable batteries through circuitry arranged to provide maximum starting speed followed by reduced speed. Starting of the motor is conveniently controlled by a breath-operated switch and stopping, at the limits of lens travel, by respective limit switches. Battery recharging terminals are preferably provided as suspension hooks to engage with electric power terminals of a storage rack when the helmet is not in service.

BACKGROUND OF THE INVENTION

Field

The invention is in the field of welding helmets wherein a powered eye-shield is arranged to open and close under the control of the wearer, preferably without use of his hands.

State of the art

The need for a system of the type concerned has been well recognized and many approaches have been taken toward filling the need, see for example U.S. Pat. Nos. 1,777,454; 2,171,052; 2,418,415; 3,086,213; and 3,159,-844. Considerable room for improvement has remained, however.

Objectives

In the making of the present invention, it was a principal objective to provide for immediate opening or closing of the eye-protective lens of a welding helmet, without the need for outside power and with a very high degree of reliability. A further objective was to enable this to be accomplished with minimum exertion by the wearer and preferably by means of blowing to initiate powered lens-opening or closing operation, the operation being halted automatically upon completion.

SUMMARY OF THE INVENTION

The foregoing objectives are achieved by the utilization of a simple worm type of self-reversing drive arrangement, such as is used in fishing reels, together with a miniature electric motor powered by rechargeable electric power means, such as one or more rechargeable dry cell batteries, mounted within the helmet and forming part of electrical circuitry which also includes a starting switch and limit switches for the open, i.e. retracted, and for the closed, i.e. extended, positions, respectively, of the lens. To achieve maximum starting speed followed by reduced speed to limit position, the electrical circuitry is arranged to deliver full power from the power means to the motor upon closing of the starting switch and for a limited period of time while the starting switch remains closed and to introduce power-consuming resistance into the circuit upon opening of the starting switch and until the particular limit switch concerned is opened.

An optional feature of the invention is the provision of a breath-operated switch as the starting switch for the motor. This conveniently takes the form of a light-force switch having an elongate, spring-biased lever arm arranged to close the switch contacts so long as the wearer of the helmet is blowing against such lever arm and to open automatically when the blowing is stopped.

The power means is conveniently recharged during the night, when the helmet is not in use, by the provision of electrical terminals in the form of hooks for engaging electrical supply terminals suitably provided for the purpose as a rack.

The drawings:

A particular construction presently contemplated as the best mode of carrying out the invention in actual practice is illustrated in the accompanying drawings, in which:

FIG. 1 is a view in rear elevation looking into the interior of a typical welding helmet equipped with the system of the invention, the eye shield lens being shown in raised, eye-protective position;

FIG. 2, a fragmentary vertical section taken on the line 2—2 of FIG. 1 and drawn to a larger scale;

FIG. 3, a vertical section taken along the line 3—3 of FIG. 2;

FIG. 4, a wiring diagram of the electrical circuitry with switches shown as they are in the rest position of FIG. 3; and FIG. 5, a fragmentary view largely in vertical section showing the helmet hung up on electrical terminals of a storage rack for recharging of the batteries.

DETAILED DESCRIPTION OF ILLUSTRATED EMBODIMENT

In its illustrated form, the system of the invention is shown in combination with a welding helmet 10 of standard design that includes a face shield 11, molded from a plastic material or otherwise fabricated to fit over the face of a welder and to be supported by a suitable head band (not shown) that is attached to posts 12 at opposite lateral sides, respectively, of the peripheral margin 11a of the rearward face-receiving opening 13 of such face shield. The helmet 10 also includes a clear window 14 in the forward wall 11b of face shield 11 and an eye-protective lens 15 in a frame 16 that is slidably mounted for up and down movement in a guideway 17 provided by a plate 18 attached to the inside surface of wall 11b of the face shield over window 14.

Such an arrangement of window and eye-protective lens is common in welding helmets.

In order to rapidly raise framed lens 15 from its lowered "open" position, so as to protect the eyes of the welder from the intense glare of the welding arc or torch as he looks at the weld through window 14, and just as rapidly lower such eye-shield from the eye-protective "closed" position to its open position, a self-reversing worm and pawl drive mechanism is employed.

The worm 19 is advantageously vertically positioned midway of lens 15 and of window 14, so as to extend entirely between the eyes of the welder in alignment with his nose. As so placed, it will not be seen by the welder and will not interfere with his vision. Moreover, it will serve its purpose most effectively because of the symmetrical arrangement relative to the width of the lens. It is rigidly attached at its upper end to the drive shift 20a of a miniature electric motor 20 that is positioned above window 14 and plate 18 by a bracket 21, and its lower end is formed as a stub shaft 19a and journaled in a bracket 18a conveniently cut and bent down from plate 18 as illustrated.

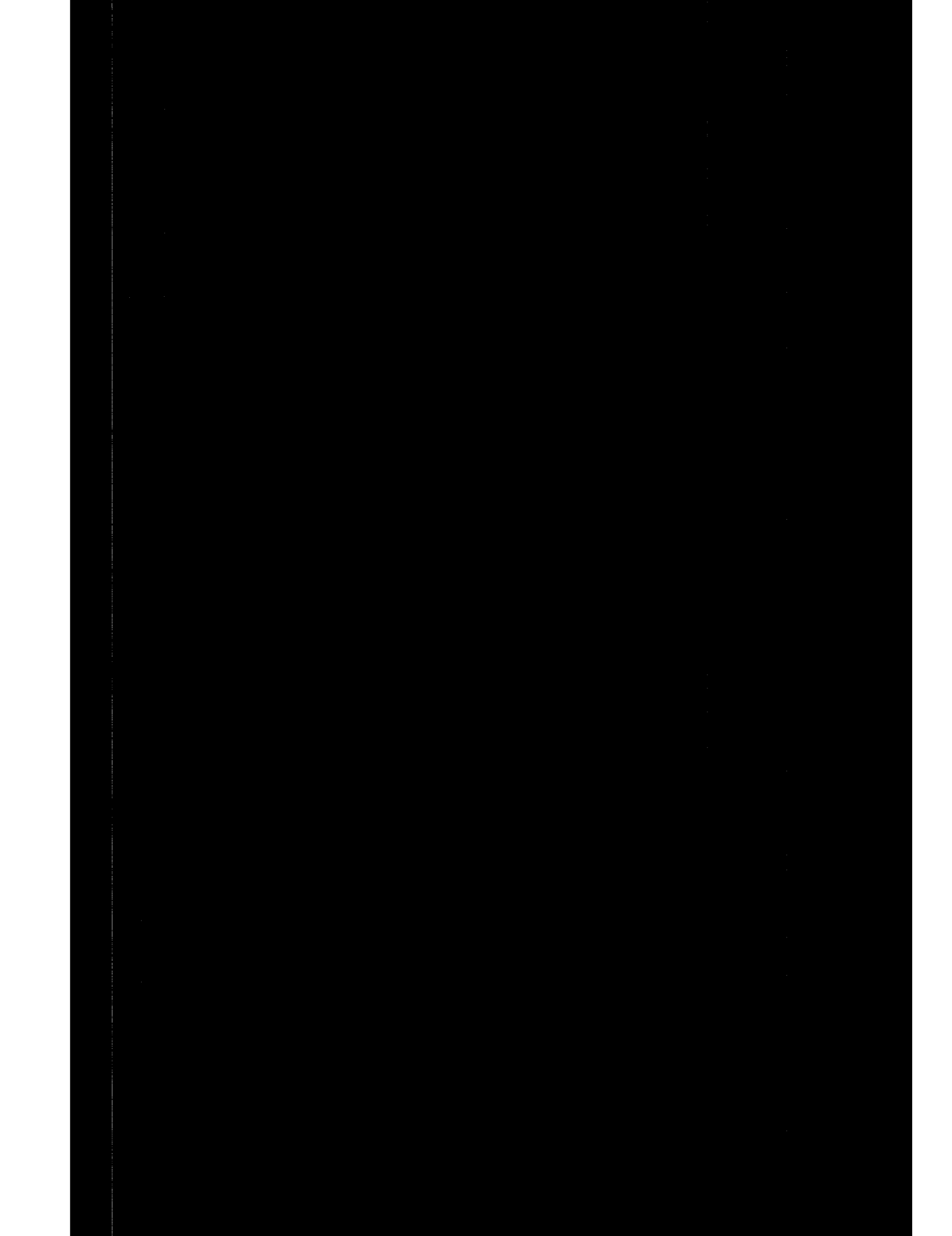

The pawl 22, within which worm 19 rotates, is fastened to and projects inwardly of face shield 11 from frame 16 of the lens. It rides upwardly and downwardly on the threads 19b of worm 19, reversal of motion being automatic with unidirectional rotation of such worm by reason